(12) United States Patent
Denteneer et al.

(10) Patent No.: US 8,687,569 B2
(45) Date of Patent: Apr. 1, 2014

(54) WIRELESS COMMUNICATION SYSTEM

(75) Inventors: Theodorus Jacobus Johannes Denteneer, Eindhoven (NL); Guido Roland Hiertz, Aachen (DE); Bernard Walke, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 628 days.

(21) Appl. No.: 12/521,880

(22) PCT Filed: Jan. 10, 2008

(86) PCT No.: PCT/IB2008/050071
§ 371 (c)(1),
(2), (4) Date: Jul. 1, 2009

(87) PCT Pub. No.: WO2008/084451
PCT Pub. Date: Jul. 17, 2008

(65) Prior Publication Data
US 2010/0046449 A1 Feb. 25, 2010

(30) Foreign Application Priority Data
Jan. 12, 2007 (EP) .................................. 07300725

(51) Int. Cl.
*H04W 4/00* (2009.01)
(52) U.S. Cl.
USPC ........................................................ 370/329

(58) Field of Classification Search
None
See application file for complete search history.

(56) References Cited

U.S. PATENT DOCUMENTS

| | | | |
|---|---|---|---|
| 2002/0141479 A1* | 10/2002 | Garcia-Luna-Aceves et al. | 375/132 |
| 2006/0280152 A1* | 12/2006 | Lee et al. | 370/338 |
| 2007/0232244 A1* | 10/2007 | Mo et al. | 455/91 |

OTHER PUBLICATIONS

Tazmaloukas et al: Channel-Hopping Multiple Access, International Conference on Communications, New Orleans, LA, Jun. 18-21, 2000, IEEE Jun. 18, 2000, pp. 415-419.

* cited by examiner

*Primary Examiner* — John Blanton
(74) *Attorney, Agent, or Firm* — Larry Liberchuk

(57) ABSTRACT

A method of allocating frequency channels in a wireless communication system comprising common channel framework enabled stations, said method comprising: —using by said common channel framework enabled stations a common frequency channel at common time intervals in order to determine a communication frequency channel on which a pair of common channel framework enabled stations will be allowed to exchange data frames, —periodically changing the common frequency channel at the beginning of each common time interval.

4 Claims, 2 Drawing Sheets

WIRELESS COMMUNICATION SYSTEM

FIELD OF THE INVENTION

The invention relates generally to a method of allocating frequency channels in a wireless communication system.

The invention also relates to a wireless station for use in a wireless communication system.

The invention finds application, for example, in wireless communication systems using the wireless standard IEEE 802.11 often referred to as WiFi (which stands for Wireless Fidelity).

BACKGROUND OF THE INVENTION

IEEE 802.11s describes an amendment for Mesh Wireless Local Area Network (WLAN). The proposal foresees different optional enhancements to enhance the current Medium Access Control (MAC). IEEE 802.11e describes the mandatory MAC of IEEE 802.11s. It is called Enhanced Distributed Channel Access (EDCA). EDCA is designed for single-hop wireless networks. It provides four different access categories for prioritization. However, EDCA cannot exploit multiple frequency channels. Thus, with a single radio frequency transceiver only a single frequency channel may be used throughout the entire Mesh WLAN.

The Common Channel Framework (CCF) is an optional method proposed in IEEE 802.11s. It provides means for switching from one frequency channel to another frequency channels using a single transceiver. Thus, separate frequency channels can be used by Mesh WLAN devices.

FIG. 1 illustrates the CCF operation. When switching from one frequency channel to another frequency channel, a station that applies CCF solely relies on physical Carrier Sensing (P-CS) to detect if this another frequency channel is idle or not. While the transceiver of this station is tuned to the common frequency channel $f_0$, other stations may exchange data frames on frequency channels other than $f_0$. Using Request to Change (RTX) and Clear to Change (CTX) frames, CCF enabled stations agree to exchange data frames on frequency channels other than $f_0$. The request to change and the clear to change contain a duration d, which defines the period necessary to transmit the actual data frames and the returning acknowledgement ACK. SIFS (Short Interframe Space) represents the shortest duration that is used for transceiver turn-around whenever a transmitter changes to receive mode and vice versa.

Let us assume that a pair of CCF enabled stations have decided to switch to frequency channel $f_n$ to exchange data frames. As this pair of stations cannot sense the frequency channel $f_n$ before switching, the pair of CCF enabled stations cannot detect if there is ongoing transmission on the frequency channel $f_n$. Thus, they may detect a busy channel after switching, namely a frequency channel already used by CCF unaware stations, and therefore may not be able to exchange data frames.

SUMMARY OF THE INVENTION

Thus, it is an object of the present invention to provide a method of allocating frequency channels in a wireless communication system, which is less sensitive to data collision and/or congestion.

In accordance with the present invention, there is provided a method of allocating frequency channels in a wireless communication system, which comprises:

using by said common channel framework enabled stations a common frequency channel at common time intervals in order to determine a communication frequency channel on which a pair of common channel framework enabled stations will be allowed to exchange data frames, periodically changing the common frequency channel at the beginning of each common time interval.

By periodically changing the common frequency channel to another frequency channel, common channel framework enabled stations are able to detect for the duration of the common time interval the presence of common channel framework unaware stations on the successive common frequency channels. As a consequence, common channel framework enabled stations can select a frequency channel for data frames exchange based on its usage by common channel framework unaware stations.

Beneficially, the method of allocating frequency channels comprises determining an occupancy level of a frequency channel during the common time interval when said channel is used as the common frequency channel.

The method of allocating frequency channels may also comprise:

storing the occupancy levels of the different frequency channels successively used as the common frequency channel, and selecting the communication frequency channel on which a pair of common channel framework enabled stations will be allowed to exchange data frames among the frequency channels having one of the lowest occupancy level.

According to an embodiment of the invention, the common frequency channel is changed at the beginning of each common time interval according to a rotation cycle within a set of available frequency channels.

The present invention also relates to a common channel framework enabled station for use in a wireless communication system comprising:

means for using a common frequency channel at common time intervals in order to determine a communication frequency channel on which said common channel framework enabled station will be allowed to exchange data frames with another common channel framework enabled station, means for periodically determining the common frequency channel at the beginning of each common time interval.

It finally relates to a computer program product directly loadable into an internal memory of a common channel framework station, comprising software code portions for performing all the steps of the allocation method when said product is run on said common channel framework station.

These and other aspects of the present invention will be apparent from, and elucidated with reference to, the embodiment described herein.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
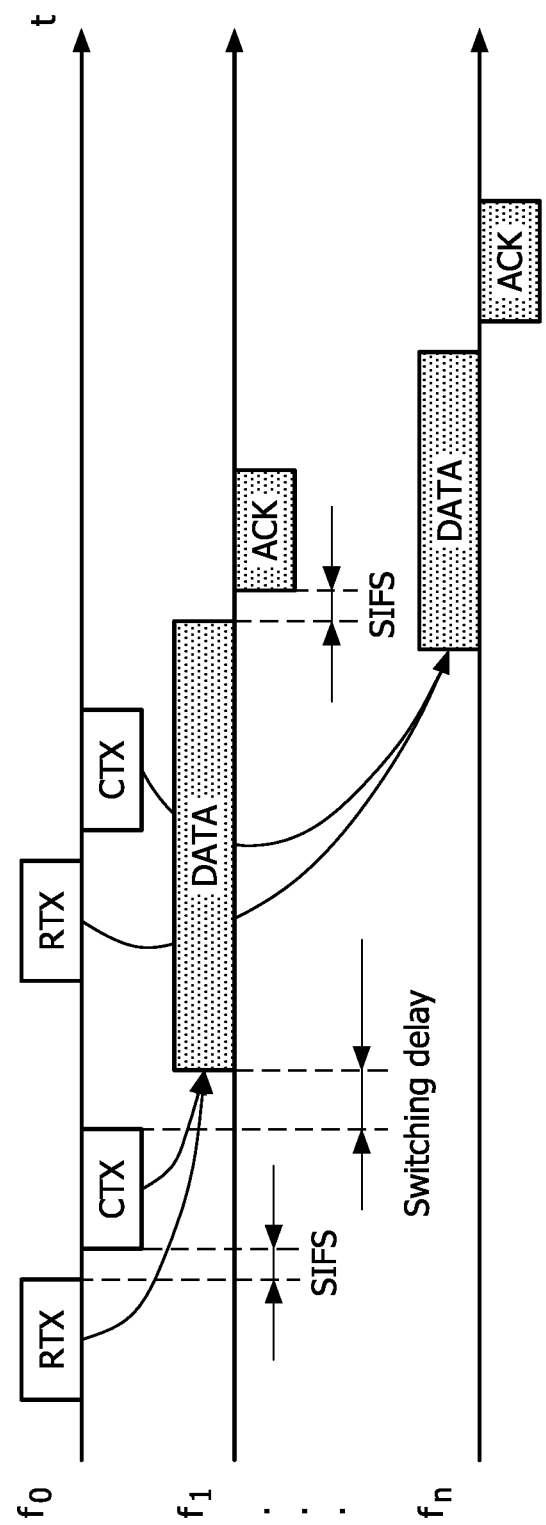
FIG. 1 is a schematic block diagram of a wireless communication system.
Figure 2:
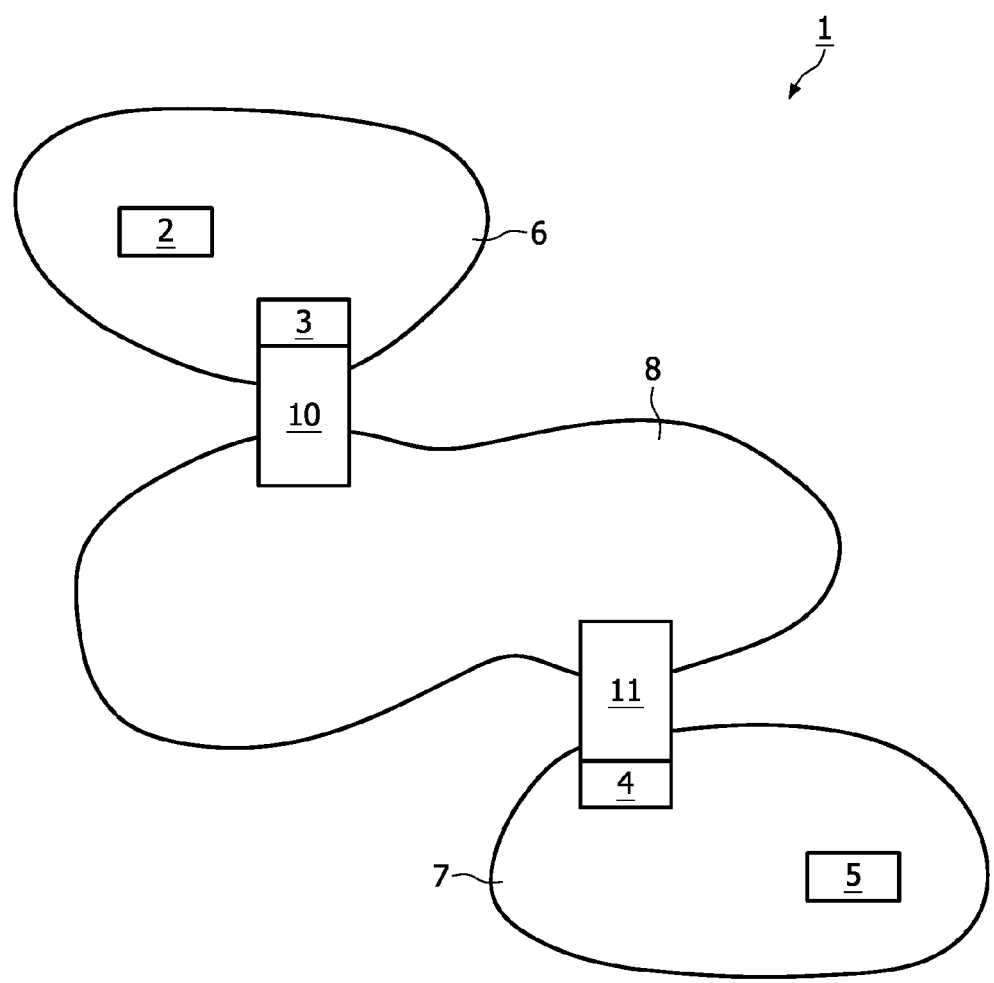
FIG. 2 is a schematic block diagram of a method in accordance with the invention.

FIG. 2 shows a schematic structure of a wireless network 1 according to an embodiment of the invention. The wireless network 1 can be used for networks according to a standard such as ANSI/IEEE Std 802.11 and further developments such as IEEE 802.11s ESS. The wireless network 1 and the method for the wireless network 1 are applicable but not limited to wireless local area networks (WLAN). The wireless network 1 and the method for the wireless network 1 may be a part or built up a wireless communication system. Thereby, the wireless network 1 may also be combined with other networks, which can be wireless or wired networks.

The addressable units of the wireless network 1 are stations 2, 3, 4, 5. Each of the stations 2 to 5 is a message destination, but not, generally, a fixed location. The stations 2 to 5 may be mobile or portable, wherein a portable one is moved from location to location, but is only used while at a fixed location, and a mobile one actually makes access to the wireless network 1 while in motion. But, propagation effects blur the distinction between portable and mobile stations 2 to 5 so that stationary stations often appear to be mobile due to propagation effects.

The architecture of the wireless network 1 comprises several components that interact to provide a wireless local area network or such, which supports station mobility to upper layers. The wireless network 1 comprises a first set 6, which comprises the stations 2, 3, and a second set 7, which comprises the stations 4, 5. The stations 2 and 3 of the first set are CCF enabled stations whereas the stations 4 and 5 of the second set are CCF unaware stations. The CCF enabled stations are able to use any frequency channel for transmission among a set of frequency channels thanks to the use of the common frequency channel. A CCF unaware station always uses a same, predetermined frequency channel for transmission.

IEEE 802.11 defines several technologies. They use different frequency channels. For example, IEEE 802.11b or g uses the 2.4 GHz band IEEE 802.11a uses the 5 GHz band. They all use 20 MHz channel. The frequency band at 2.4 GHz typically covers 2.400-2.483, 5 MHz. The frequency band at 5 GHz consists of three blocks in Europe: 5.15-5.25 GHz, 5.25-5.35 GHz, 5.470-5.725 GHz. With respect to IEEE 802.11b/g, there are 13 channels in Europe, only 3 of them being non-overlapping. At 5 GHz there are about 19 non-overlapping channels.

The wireless network 1 comprises a distribution system 8. The distribution system 8 allows communication between stations 2, 5 of the sets 6 and 7. Data frames move between the first set 6 and the distribution system 8 via an access point 10. Further, data frames move between the second set 7 and the distribution system 8 via an access point 11. Thereby, it is advantageous that each of the access points 10, 11 is a station (here station 3 and 4, respectively) that provides access to the distribution system 8 by providing a distribution system service in addition to acting as a station 3, 4.

As mentioned earlier, when CCF enabled stations 2 and 3 want to exchange data frames, the transceiver of each station is tuned to the common frequency channel $f_0$ at the beginning of a common time interval so as to determine the frequency channel at which they are going to exchange said data frames.

The invention proposes to frequently change the common frequency channel. As CCF enabled stations are synchronized to a common clock, they periodically meet at common time intervals at the common frequency channel. To allow for sensing, discovery, detection and learning about frequently occupied and less used frequency channels, the invention foresees to periodically tune the common channel to another frequency channel.

According to an embodiment of the invention, CCF enabled stations rotates the common frequency channel at the beginning of each common interval. The parameters of common time interval (e.g. its starting time and duration) are known and followed by all CCF enabled station. In IEEE 802.11 the beacon interval (also called superframe) forms such a common interval. The beacon interval is a period that can be set by the administrators. Today's products usually send a beacon every 100 ms.

Therefore, at the beginning of a current superframe, CCF enabled stations tune their transceiver to common frequency channel other than the one used during the immediately previous superframe. An algorithm common to all the CCF enabled station enables that all CCF enabled stations synchronously switch to the same common frequency channel. Such an algorithm is for example:

$$\text{new-channel-number} = [(\text{last-channel-number})+1] \bmod (\text{amount-of-channels})$$

where:
new-channel-number is the number of the current common frequency channel;
last-channel-number is the number of the previous common frequency channel; and
amount-of-channels is the number of frequency channels available for wireless communication.

With every change of the common frequency channel to another frequency channel, CCF enabled stations can detect for a full superframe period the presence of CCF unaware stations on that frequency channel. CCF enabled stations further sense the frequency channel and identify the busy periods to learn about the frequency channel usage. After the CCF enabled stations have used all available frequency channels once as a common frequency channel, they switch to data channels that are lightly loaded with higher probability for data frames exchange than to frequency channels that have been identified as heavily used. While CCF enabled stations proceed to change the common frequency channel to different frequency channels, they maintain learning about other frequency channels and thus adapt their behavior in selecting frequency channels for data frame exchange. Thus, CCF enabled stations may adjust the probability of a given frequency channel to be selected for data frames exchange.

The CCF enabled stations avoid unnecessary switching to frequency channels that are very likely to be occupied by CCF unaware stations. They further avoid collisions and balance the frequency channel usage as lightly used frequency channel preferably will be used.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa.

The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of allocating frequency channels in a wireless communication system comprising common channel framework enabled stations, comprising:
   using by said common channel framework enabled stations a common frequency channel at common time intervals in order to determine a communication frequency channel on which a pair of common channel framework enabled stations will be allowed to exchange data frames, and
   periodically rotating the common frequency channel at the beginning of each beacon interval according to a rotation cycle within a set of available frequency channels.

2. The method of claim 1, further comprising:
   determining an occupancy level of a frequency channel during the common time interval when said channel is used as the common frequency channel.

3. The method of claim 1, further comprising:
   storing the occupancy levels of the different frequency channels successively used as the common frequency channel, and
   selecting the communication frequency channel on which a pair of common channel framework enabled stations will be allowed to exchange data frames among the frequency channels having one of the lowest occupancy level.

4. A common channel framework enabled station for use in a wireless communication system comprising:
   a transceiver for tuning to a common frequency channel at common time intervals in order to determine a communication frequency channel on which said common channel framework enabled station will be allowed to exchange data frames with another common channel framework enabled station, the common channel framework enabled station for rotating the common frequency channel at the beginning of each beacon interval according to a rotation cycle within a set of available frequency channels.

* * * * *